US011222368B2

(12) United States Patent
Kaneko

(10) Patent No.: US 11,222,368 B2
(45) Date of Patent: Jan. 11, 2022

(54) INFORMATION PROCESSING DEVICE, INFORMATION PROCESSING METHOD, AND NON-TRANSITORY COMPUTER READABLE MEMORY

(71) Applicant: Rakuten Group, Inc., Tokyo (JP)

(72) Inventor: Kosuke Kaneko, Tokyo (JP)

(73) Assignee: RAKUTEN GROUP, INC., Tokyo (JP)

( * ) Notice: Subject to any disclaimer, the term of this patent is extended or adjusted under 35 U.S.C. 154(b) by 0 days.

(21) Appl. No.: 16/944,287

(22) Filed: Jul. 31, 2020

(65) Prior Publication Data

US 2021/0035164 A1 Feb. 4, 2021

(30) Foreign Application Priority Data

Aug. 2, 2019 (JP) .............................. JP2019-142993

(51) Int. Cl.
*G06Q 30/00* (2012.01)
*G06Q 30/02* (2012.01)
*G05B 19/418* (2006.01)

(52) U.S. Cl.
CPC ..... *G06Q 30/0275* (2013.01); *G06Q 30/0267* (2013.01); *G06Q 30/0277* (2013.01)

(58) Field of Classification Search
CPC ........... G06Q 30/0275; G06Q 30/0267; G06Q 30/0277
See application file for complete search history.

(56) References Cited

U.S. PATENT DOCUMENTS

| | | | |
|---|---|---|---|
| 2002/0013656 A1 | 1/2002 | Namba | |
| 2013/0212619 A1* | 8/2013 | Yerli | H04N 21/812 725/32 |
| 2016/0210666 A1* | 7/2016 | Ataka | G06Q 30/0277 |
| 2016/0253710 A1* | 9/2016 | Publicover | H04N 21/4532 705/14.66 |
| 2019/0034976 A1* | 1/2019 | Hamedi | G06Q 30/0204 |
| 2019/0318392 A1* | 10/2019 | Smith | G06Q 50/01 |

FOREIGN PATENT DOCUMENTS

| | | |
|---|---|---|
| JP | 2002-41554 A | 2/2002 |
| JP | 2010-211777 A | 9/2010 |
| JP | 5699233 B1 | 4/2015 |

OTHER PUBLICATIONS

"Optimizing Display Advertising Markets: Challenges and Directions". IEEE. (Year: 2015).*

* cited by examiner

*Primary Examiner* — Maria V Vanderhorst
(74) *Attorney, Agent, or Firm* — Sughrue Mion, PLLC

(57) ABSTRACT

AN information providing server SA determines whether a display condition is satisfied, the display condition being a condition for displaying advertising content of a specific advertiser on a first advertising space which is set on a medium that can be displayed on a terminal. And then, the information providing server SA switches, in a case where the display condition is not satisfied, the first advertising space to a second advertising space to display advertising content of an advertiser who wins a bid on the basis of bid information.

8 Claims, 13 Drawing Sheets

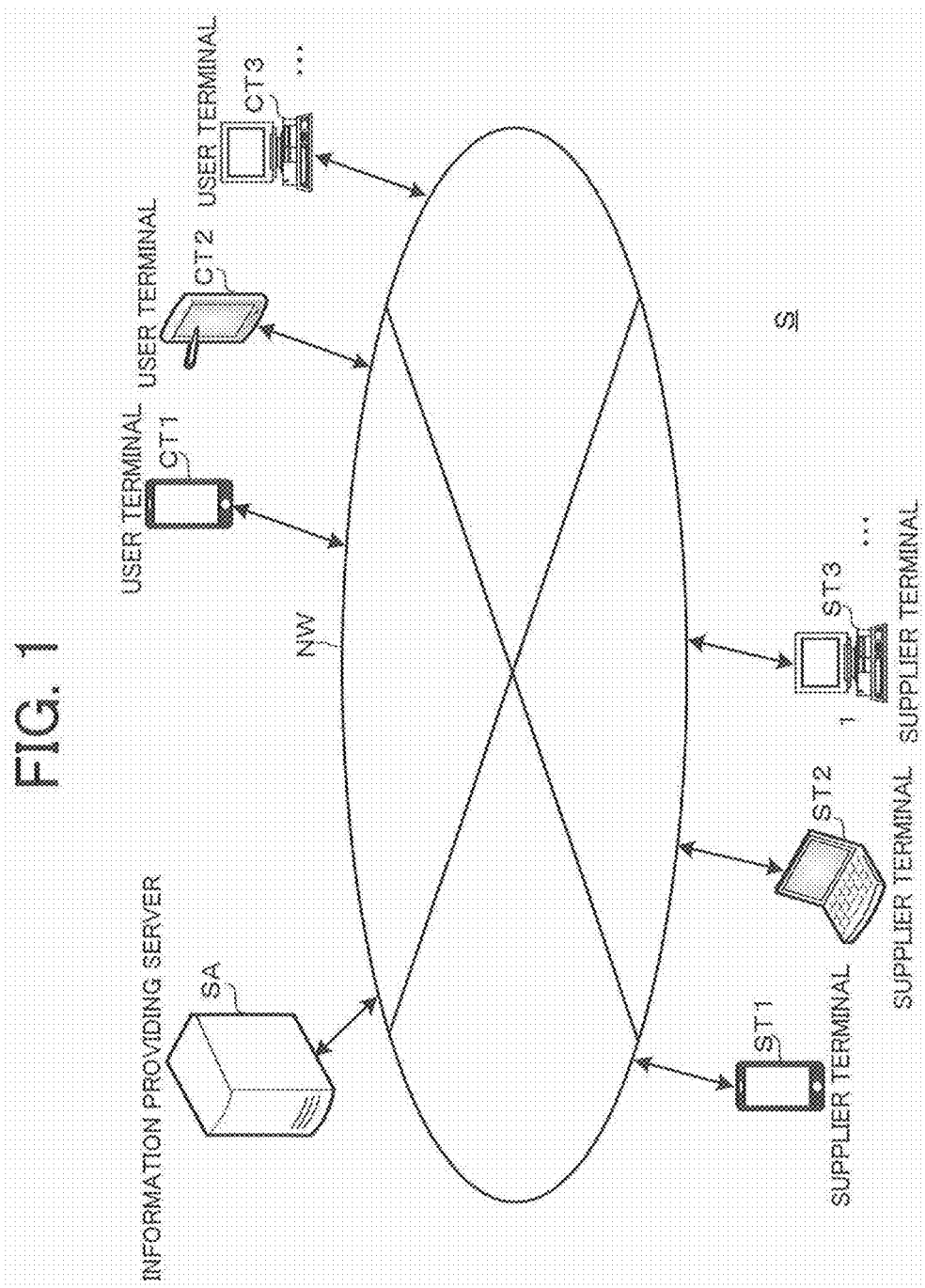

FIG. 4A

TRANSACTION TARGET DATABASE 21

| FACILITY ID | ROOM ID | PRICE INFORMATION | DETAILED INFORMATION | | |
|---|---|---|---|---|---|
| | | | ROOM TYPE | NUMBER OF ACCEPTABLE PEOPLE | ... |
| F0001 | R10001 | ¥20,000 | S | 2 | ... |
| | R10002 | ¥30,000 | M | 4 | ... |
| | R10003 | ¥35,000 | L | 6 | ... |
| | ... | ... | ... | ... | ... |
| F0002 | R20001 | ¥25,000 | S | 3 | ... |
| | R20002 | ¥35,000 | M | 5 | ... |
| | ... | ... | ... | ... | ... |
| F0003 | R30001 | ¥15,000 | S | 1 | ... |
| | R30002 | ¥40,000 | M | 3 | ... |
| | ... | ... | ... | ... | ... |

FIG. 4B

STOCK DATABASE 22

| FACILITY ID | ROOM TYPE | STOCK INFORMATION | | ... |
| --- | --- | --- | --- | --- |
| | | DATE | NUMBER OF REMAINING ROOMS | |
| F0001 | S | ... | ... | ... |
| | | 2019/9/1 | 2 | ... |
| | | 2019/9/2 | 4 | ... |
| | | 2019/9/3 | 0 | ... |
| | | ... | ... | ... |
| | M | ... | ... | ... |
| | | 2019/9/1 | 0 | ... |
| | | 2019/9/2 | 1 | ... |
| | | 2019/9/3 | 0 | ... |
| | | ... | ... | ... |
| | L | ... | ... | ... |
| | | 2019/9/1 | 3 | ... |
| | | 2019/9/2 | 0 | ... |
| | | 2019/9/3 | 1 | ... |
| | | ... | ... | ... |
| | ... | ... | ... | ... |
| F0002 | S | ... | ... | ... |
| | | 2019/9/1 | 0 | ... |
| | | 2019/9/2 | 0 | ... |
| | | 2019/9/3 | 0 | ... |
| | | ... | ... | ... |
| | M | ... | ... | ... |
| | | 2019/9/1 | 2 | ... |
| | | 2019/9/2 | 1 | ... |
| | | 2019/9/3 | 0 | ... |
| | | ... | ... | ... |
| | ... | ... | ... | ... |
| F0003 | S | ... | ... | ... |
| | | 2019/9/1 | 1 | ... |
| | | 2019/9/2 | 1 | ... |
| | | 2019/9/3 | 3 | ... |
| | | ... | ... | ... |
| | M | ... | ... | ... |
| | | 2019/9/1 | 1 | ... |
| | | 2019/9/2 | 0 | ... |
| | | 2019/9/3 | 0 | ... |
| | | ... | ... | ... |
| | ... | ... | ... | ... |
| ... | ... | ... | ... | ... |

FIG. 5A

ADVERTISING SPACE DATABASE 23

| ADVERTISING SPACE ID | PAGE ID | PAGE POSITION | ADVERTISING SPACE TYPE | ADVERTISING SPACE INFORMATION |
|---|---|---|---|---|
| A000001 | P00001 | (x1,y1)... | GUARANTEED SPACE | ... |
| A000002 | P00002 | (x1,y1)... | GUARANTEED SPACE | ... |
| A000003 | P00002 | (x2,y2)... | NON-GUARANTEED SPACE | ... |
| A000004 | P00003 | (x1,y1)... | GUARANTEED SPACE | ... |
| A000005 | P00003 | (x2,y2)... | NON-GUARANTEED SPACE | ... |
| A000006 | P00003 | (x3,y3)... | NON-GUARANTEED SPACE | ... |
| ... | ... | ... | ... | ... |

FIG. 5B

SPECIFIC ADVERTISER DATABASE 24

| ADVERTISER ID | ADVERTISING SPACE ID | ADVERTISING CONTENT | CONTRACT PERIOD | ... |
|---|---|---|---|---|
| S0001 | A000001 | S0001.xxx | ... | ... |
| S0002 | A000002 | S0002.xxx | ... | ... |
| S0003 | A000004 | S0003.xxx | ... | ... |
| S0004 | A000010 | S0004.xxx | ... | ... |
| S0005 | A000010 | S0005.xxx | ... | ... |
| ... | ... | ... | ... | ... |

FIG. 5C

BID DATABASE 25

| ADVERTISER ID | PAGE ID | ADVERTISING CONTENT | BID INFORMATION | ... |
|---|---|---|---|---|
| S0011 | P00001 | S0011.xxx | ... | ... |
| S0012 | P00001 | S0012.xxx | ... | ... |
| S0013 | P00001 | S0013.xxx | ... | ... |
| S0014 | P00001 | S0014.xxx | ... | ... |
| S0015 | P00001 | S0015.xxx | ... | ... |
| ... | ... | ... | | |

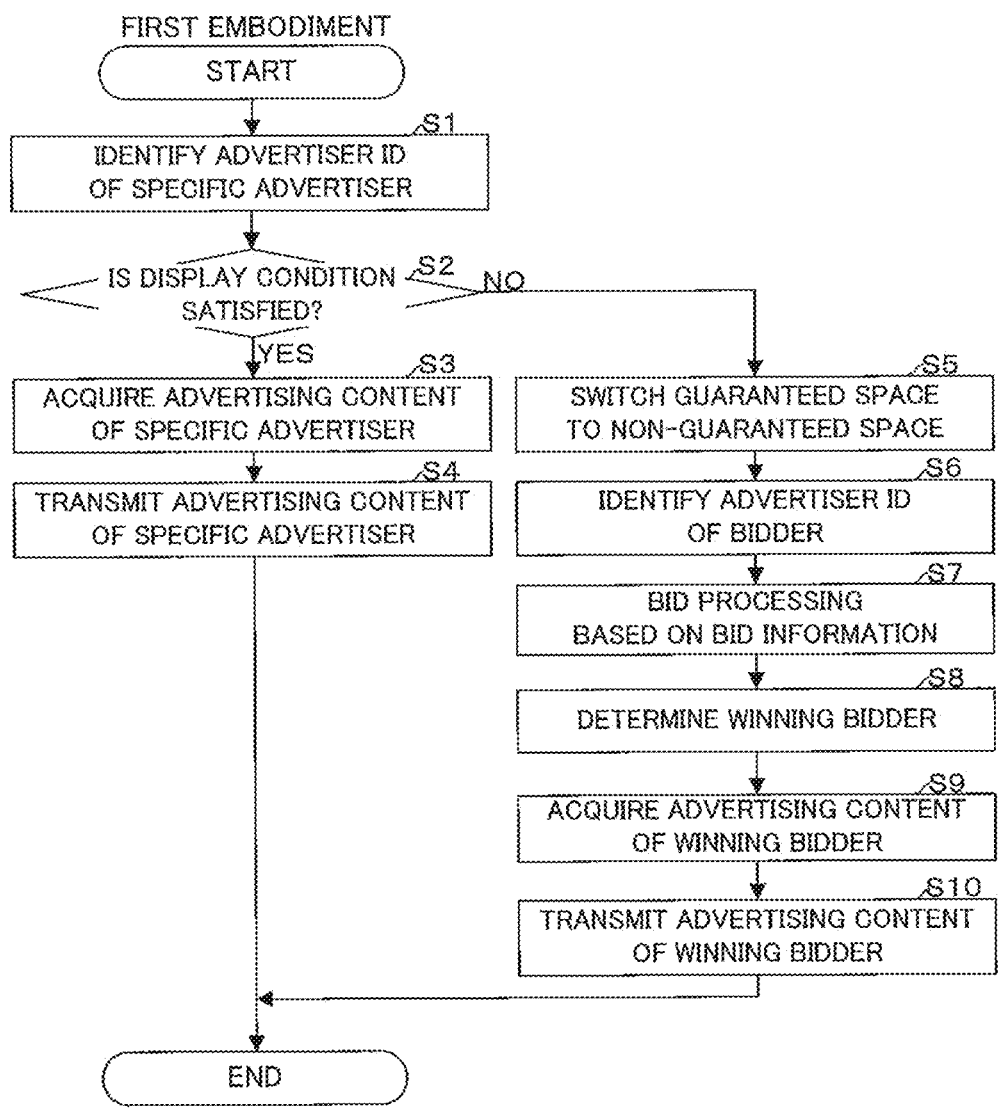

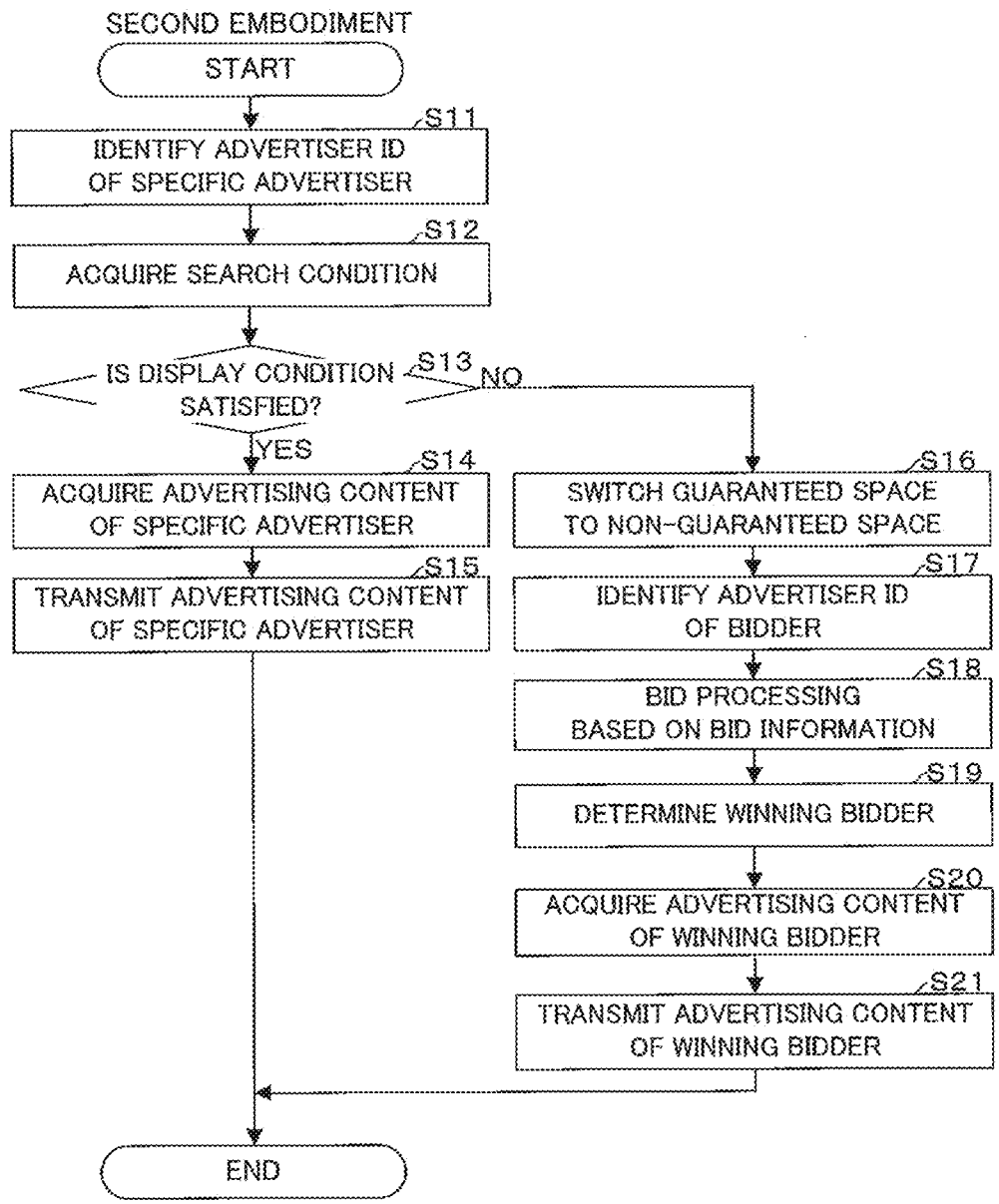

FIG. 8

SEARCH CONDITION INPUT PAGE

IN

| KEYWORD | |
|---|---|
| ACCOMMODATION DESTINATION | TOKYO |
| SCHEDULE | 2019/9/1 | 2019/9/2 |
| NUMBER OF USERS | 2 |
| FEE | |

SEARCH  B

INFORMATION PROCESSING DEVICE, INFORMATION PROCESSING METHOD, AND NON-TRANSITORY COMPUTER READABLE MEMORY

CROSS REFERENCE TO RELATED APPLICATION

This application claims priority from Japanese Patent Application No. 2019-142993 which was filed on Aug. 2, 2019, the disclosure of which is herein incorporated by reference in its entirety.

BACKGROUND OF INVENTION

Field

In related art, a system for displaying advertising content is known. The advertising content is submitted by an advertiser and is displayed on an advertising space (in other words, advertising frame or advertising area) provided in a web page. The system performs a transition to a web page of the advertiser in a case where the advertising content is selected by a user. As types of such advertising content, for example, there are cost per selection advertisement in which a charged amount is determined according to the number of times of selection, and cost per mile advertisement in which a charged amount is determined according to the number of times of displaying (for example, Patent Literature 1). As one of advertising spaces, there is a priority advertising space in which displaying is guaranteed in principle during a contract period.

Related Art

By the way, even for the same advertising content, there is a case where an advertising value varies depending on a search condition. For example, in a travel site, a remaining room status of a facility varies depending on a date on which a user desires to stay according to a search condition. Thus, a conversion rate from advertising content of the facility greatly varies. Accordingly, depending on a search condition by a user, there is a case where it is not possible to reserve a room due to a lack of remaining rooms when the user that browses advertising content displayed on the priority advertising space selects a facility shown in the advertising content and tries to reserve the room. Thus, a state returns to that before the selection of the facility and a series of actions by the user is wasted. Also, it is hard to say that the advertiser can effectively use the advertising space. This also applies to various transaction targets other than the room of the facility.

Therefore, one or more embodiments of the present invention are directed to provide an information processing device, information processing method, and a non-transitory computer readable memory that can make an advertiser effectively use an advertising space while reducing a wasted operation by a user that browses advertising content.

Patent Literature 1: Japanese Patent No. 5699233

SUMMARY OF INVENTION

In response to the above issue, the information processing device includes: at least one memory configured to store program code; and at least one processor configured to access the program code and operate as instructed by the program code. The program code includes: determination code configured to cause at least one processor to determine whether a display condition is satisfied, the display condition being a condition for displaying advertising content of a specific advertiser on a first advertising space which is set on a medium that can be displayed on a terminal; and switching code configured to cause at least one processor to switch, in a case where the display condition is not satisfied, the first advertising space to a second advertising space to display advertising content of an advertiser who wins a bid on the basis of bid information.

The program code may include a first display control code configured to cause at least one processor to perform processing of displaying, on the second advertising space switched by the switching code, the advertising content of the advertiser who wins the bid on the basis of the bid information of the advertiser.

The advertising content may include information of a transaction target provided by the specific advertiser, and the determination code may cause the at least one processor to determine that the display condition is not satisfied in a case where there is no stock of the transaction target.

The advertising content may include information of a transaction target provided by the specific advertiser, and the determination code may cause the at least one processor to determine that the display condition is not satisfied in a case where the transaction target does not correspond to a search condition input by a user of the terminal.

The advertising content may include information of a transaction target provided by the specific advertiser, and the determination code may cause the at least one processor to determine that the display condition is not satisfied in a case where there is not the transaction target corresponding to a usage date input by a user of the terminal.

The program code may include a processing code configured to cause at least one processor to perform bid processing, in a case where the display condition is not satisfied, with respect to the advertiser the bid information of which includes regional information associated with the medium or regional information that belongs to a lower layer of the regional information.

The program code may include: setting code configured to cause at least one processor to set the first advertising space to display the advertising content of the specific advertiser on a medium with which regional information specified by the specific advertiser is associated; and second display code configured to cause at least one processor to perform, in a case where the display condition is satisfied, processing of displaying, on the advertising space, the advertising content of the specific advertiser, the advertising content being related to the regional information.

The first advertising space may be an advertising space to display advertising content of each of a plurality of the specific advertisers. The determination code may cause the at least one processor to determine, for each of the specific advertisers, whether the display condition is satisfied, and The switching code may cause the at least one processor to switch, in a case where the display condition is not satisfied with respect to each of the specific advertisers, the first advertising space to the second advertising space to display the advertising content of the advertiser who wins the bid on the basis of the bid information.

The information processing method performed by at least one computer. The method includes: determining whether a display condition is satisfied, the display condition being a condition for displaying advertising content of a specific advertiser on a first advertising space which is set on a medium that can be displayed on a terminal; and switching, in a case where the display condition is not satisfied, the first advertising space to a second advertising space to display advertising content of an advertiser who wins a bid on the basis of bid information.

The non-transitory computer readable memory having stored thereon a program configured to cause a computer, to: determine whether a display condition is satisfied, the display condition being a condition for displaying advertising content of a specific advertiser on a first advertising space which is set on a medium that can be displayed on a terminal; and switch, in a case where the display condition is not satisfied, the first advertising space to a second advertising space to display advertising content of an advertiser who wins a bid on the basis of bid information.

BRIEF DESCRIPTION OF THE DRAWINGS

FIG. 1 is a diagram illustrating a schematic configuration example of an information providing system S.

FIG. 4A is a view illustrating an example of data storage in a transaction target database 21 in a case where the transaction target is a room of a facility.

FIG. 4B is a view illustrating an example of data storage in a stock database 22 in a case where the transaction target is a room of a facility.

FIG. 5A is a view illustrating an example of data storage in an advertising space database 23.

FIG. 5B is a view illustrating an example of data storage in a specific advertiser database 24.

FIG. 5C is a view illustrating an example of data storage in a bid database 25.

FIG. 6 is a flowchart illustrating an example of processing of the system control unit 3 in a first embodiment.

FIG. 7 is a flowchart illustrating an example of processing of the system control unit 3 in a second embodiment.

FIG. 8 is a view illustrating an example of a search condition input page for a transaction target.

DETAILED DESCRIPTION

Figure 2A:
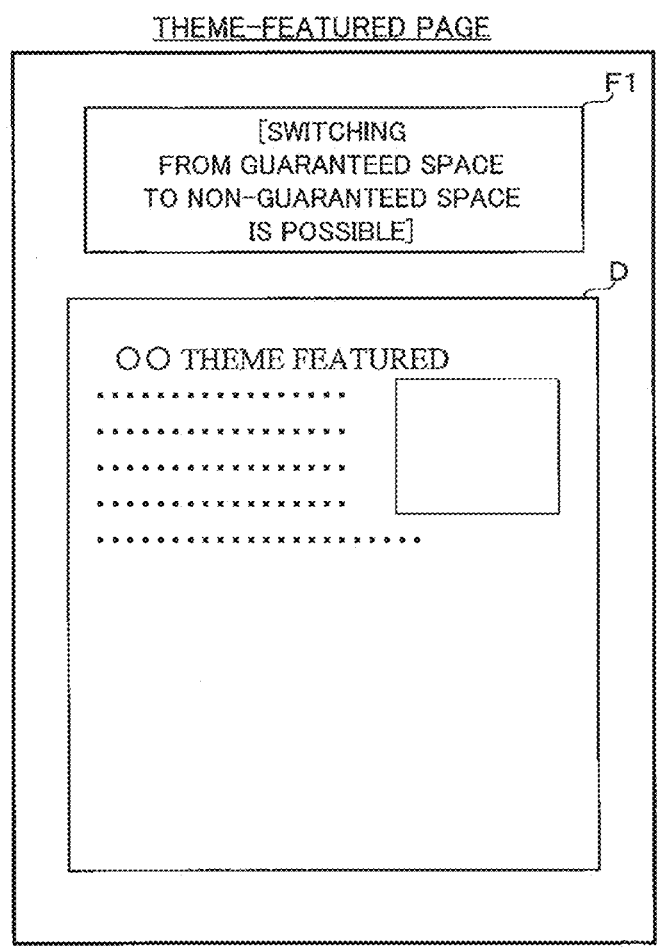
FIG. 2A is a view illustrating an example of a theme-featured page of a transaction target.

Hereinafter, example embodiments of the present invention will be described with reference to the drawings.

[1. Outline of Configuration and Function of Information Providing System S]

First, an outline of a configuration and function of an information providing system S according to the present embodiment will be described with reference to FIG. 1. FIG. 1 is a diagram illustrating a schematic configuration example of the information providing system S. As illustrated in FIG. 1, the information providing system S includes supplier terminals STm (m=1, 2, 3 . . . ), user terminals CTn (n=1, 2, 3 . . . ), an information providing server SA, and the like. Each of the supplier terminals STm, the user terminals CTn, and the information providing server SA can be connected to a network NW. The network NW includes, for example, the Internet, a mobile communication network, a wireless base station thereof, and the like. As the supplier terminals STm and the user terminals CTn, for example, a personal computer (PC), a smartphone, a tablet, a mobile phone, a portable game player, and the like can be applied.

Each of the supplier terminals STm is a terminal used by a supplier (e.g., facility or company) that supplies a transaction target. Here, the transaction target corresponds to a purchase target or a reservation target. The purchase target is an item such as a book, food and drink, daily necessities, an interior product, a home appliance, a sports equipment, a ticket, or a vehicle. The reservation target is a room such as a guest room or a meeting room of a facility (e.g., hotel), a seat on a transportation means (e.g., aircraft, ship, bus, or train), a seat in an eating place (e.g., restaurant), or the like. In addition, reservation targets also include seats in a movie theater, a theater, and a ball game ground (e.g., baseball field), and the like. Alternatively, there is a case where a facility having the room, a transportation means having the seat, or an eating place having the seat is called the reservation target. In a case of the eating place, a table may be called the reservation target. In addition, a rental car can be also the reservation target. Incidentally, as a purchase target, there is a travel plan including a combination of a room in an accommodation facility and a seat on a transportation means in a predetermined period. The supplier can access an electronic commerce (EC) site via a network NW with the supplier terminal STm and register information of the transaction target.

Each of the user terminals CTn is a terminal used by a user that purchases or reserves the transaction target. The user can access the EC site with the user terminal CTn via the network NW and browse information of the transaction target via a page (example of a medium) provided from the EC site. Here, for example, the page is a web page or the like that includes structured document data such as HTML (HyperText Markup Language) or XHTML and that can be browsed with a browser.

The information providing server SA includes one or a plurality of server computers and is an example of the information processing device of an embodiment of the present invention. The information providing server SA is a server that provides the website such as the EC site to which a specific URL (Uniform Resource Locator) is assigned on the network NW. Examples of EC sites include a travel site, a facility reservation site, a shopping mall site, a store reservation site, a ticketing site, and the like. Pages provided by the EC sites (that is, pages that can be displayed on the user terminal CTn) include various page types (types according to service, according to theme, according to season, according to area, and the like) such as a service top page, theme-featured page, seasonal feature page, an area page, or the like of the transaction target. Moreover, the pages provided by the EC sites also include a search condition input page to input a search condition for the transaction target, a search result page of the transaction target found by a search engine on the basis of the search condition, or a landing page (e.g., store item page) created to improve a conversion rate of the transaction target. Incidentally, the pages provided by the EC sites also include a page in which a place tag indicating regional information is associated (set). The regional information is preferably layered from an upper layer (e.g., Tokyo) to a lower layer (e.g., Shibuya, or Roppongi).

Then, an advertising space to display advertising content of an advertiser is set on the pages (that is, set in a partial region in the pages). Here, the advertising space to display advertising content of the advertiser is "a first advertising space". For example, the supplier that supplies the transaction target can purchase, as the advertiser, the advertising space according to a contract with a site operator in order to improve a conversion rate of the transaction target supplied by itself. As advertising space types, there are a guaranteed space and a non-guaranteed space. The guaranteed space is the advertising space in which displaying of advertising content is guaranteed in principle during a contract period, and is switched to the non-guaranteed space according to a display condition described later. In other words, the advertising space purchased by the advertiser is a space in which the guaranteed space and the non-guaranteed space are assigned according to each situation or each timing. The guaranteed space is a guaranteed-type space in which displaying of advertising content is guaranteed under a certain condition. The non-guaranteed space is a non-guaranteed-type space that is sold at auction including other advertisers and becomes no longer the guaranteed-type in a case where the certain condition is not satisfied. Therefore, in the present description, the guaranteed space is a space that may be changed to the non-guaranteed space. The advertiser that purchases such guaranteed space is referred to as a specific advertiser. In principle, the guaranteed space can be said as an advertising space to display advertising content of the specific advertiser. A charging method with a guaranteed publication period is adopted as a charging method for the guaranteed space. That is, this is a charging method in which a cost (usage amount) is incurred for guaranteeing advertisement display in a predetermined period. Further, a selection (click or tap) charging method (e.g., Cost Per Click) may be added to as the charging method for the guaranteed space. This is a charging method in which a cost is incurred each time advertising content is selected. Furthermore, an impression charging (e.g., cost per mile) method or an affiliate charging method may be adopted. When purchasing the guaranteed space, the advertiser specifies a page on which the guaranteed space is set. However, in a case where a place tag is associated with a page, the page can be identified by specifying of the place tag.

On the other hand, the non-guaranteed space is an advertising space in which advertising content of an advertiser who has won a bid (that is, an advertiser who has been successful) by bid processing executed on the basis of bid information of the advertiser is displayed. Here, the advertising space to display advertising content of an advertiser who has won a bid on the basis of bid information is "a second advertising space". Incidentally, the expression of "non-guaranteed space" is set as an expression opposite to the guaranteed space. Thus, in other words, the non-guaranteed space means a bid-type advertising space or an auction-type advertising space. A form of the bid processing is preferably real-time bidding (RTB) executed for each impression (that is, each time an advertising space set on a page is displayed). The Real-time bidding is performed, for example, by utilization of a platform including a SSP (Supply Side Platform) and a DSP (Demand-Side Platform). The bid information includes a bid price (that is, bidding amount) specified by the advertiser. For example, in a case where a plurality of advertisers bid on a non-guaranteed space, an auction is held. And then, an advertiser with the highest score among scores calculated on the basis of bid prices respectively specified by the advertisers can purchase the non-guaranteed space as a winning bidder (that is, a successful bidder).

Incidentally, a second price system is preferably employed for a winning bid price (that is, a successful bid price). For example, a winning bid price is a second highest bid price +1 yen (or +1 dollar). Moreover, a minimum winning bid price (floor price) may be set for the non-guaranteed space. In this case, in a case where a winning bid price is lower than the minimum winning bid price, advertising content of the winning bidder is not displayed on the non-guaranteed space. As a charging method of the non-guaranteed space, for example, a selection (click or tap) charging method (e.g., Cost Per Click) is adopted. An impression charging (e.g., cost per mile) method or an affiliate charging method may be adopted. When bidding on the non-guaranteed space, the advertiser specifies a page on which the non-guaranteed space is set. However, in a case where a place tag is associated with a page, the page can be identified by specifying of the place tag.

Figure 2B:
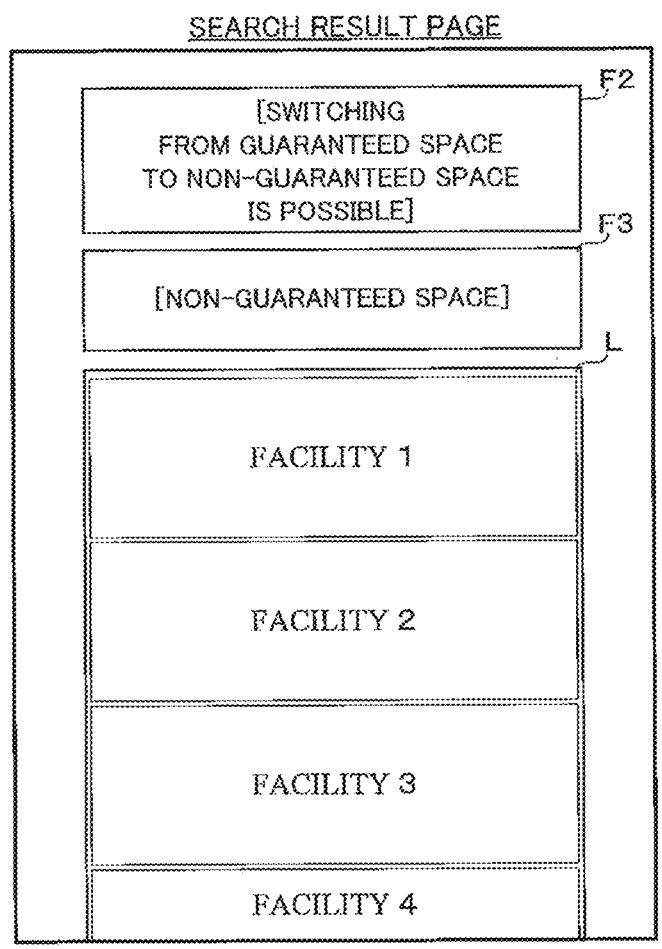
FIG. 2B is a view illustrating an example of a search result page of a transaction target.

FIG. 2A is a view illustrating an example of a theme-featured page of the transaction target. In the theme-featured page illustrated in FIG. 2A, a guaranteed space F1 on which advertising content of the specific advertiser is displayed is set in addition to a display column D that displays information related to a featured theme. This guaranteed space F1 is switched to a non-guaranteed space F1 in the same position according to a display condition (described later). Incidentally, the guaranteed space F1 can be also set on pages such as a service top page or an area page. FIG. 2B is a view illustrating an example of a search result page of the transaction target. In the search result page illustrated in FIG. 2B, in addition to a list L of search results, a non-guaranteed space F3 on which advertising content of an advertiser that has won a bid by bid processing is displayed is set together with a guaranteed space F2 similar to that in the theme-featured page. Here, the guaranteed space F2 and the non-guaranteed space F3 may be displayed as a native (content-friendly) type mixed (mingled) with the list L of search results, or may be distinguished from the list L of search results and displayed as a banner type. Incidentally, advertising content of the transaction target that corresponds to a search condition can be displayed as a keyword-targeted type advertisement in each of the guaranteed space F2 and the non-guaranteed space F3.

Figure 3A:
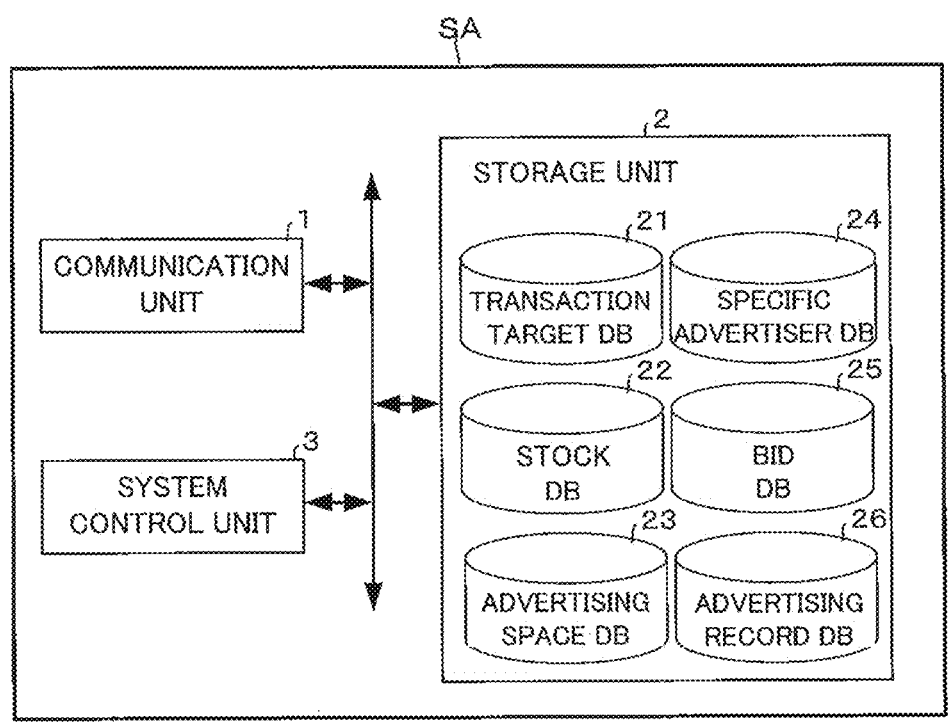
FIG. 3A is a block diagram illustrating a schematic configuration example of an information providing server SA.

FIG. 3A is a block diagram illustrating a schematic configuration example of the information providing server SA. As illustrated in FIG. 3A, the information providing server SA includes a communication unit 1, a storage unit 2, a system control unit 3, and the like. The communication unit 1 has a function of being connected to the network NW and performing communication. The storage unit 2 includes, for example, a hard disk drive or the like and stores an OS, a server program including information processing program, and the like. Incidentally, the server program may be downloaded from a predetermined server to the information providing server SA, or may be read from a recording medium such as a CD or DVD and stored in the storage unit 2.

Further, a transaction target database (DB) 21, a stock database (DB) 22, an advertising space database (DB) 23, a specific advertiser database (DB) 24, a bid database (DB) 25, an advertising record database (DB) 26, and the like are built in the storage unit 2. Incidentally, these databases may be distributed, for example, in database servers and the like other than the information providing server SA. Moreover, in addition to these databases, there may be a database that stores information related to a supplier, a database that stores information related to a user, and a database that stores information related to a page.

The transaction target database 21 is a database that stores information related to transaction targets. In the transaction target database 21, for example, a supplier ID of a supplier that supplies the transaction target, a transaction target ID of the transaction target, price information of the transaction target, detailed information of the transaction target, and the like are stored in association with each supplier. Here, the ID is identification information (e.g., identification number or identification code) (same applies hereinafter). The price information indicates the price (amount) set by the supplier. The detailed information varies depending on the transaction target. In a case where the transaction target is the item, the supplier ID is a store ID of a store that sells the item, the transaction target ID is an item ID of the item, the price information indicates a selling price of the item, and the detailed information includes a item category, item specs (specifications), and the like. Incidentally, in a case where the item is a travel plan, the detailed information includes, for example, information of a travel destination, a travel schedule, an accommodation facility, a transportation means, and the like.

Moreover, in a case where the transaction target is a room of a facility, the supplier ID is a facility ID of the facility (or operator of the facility) that provides the room, the transaction target ID is a room ID of the room, the price information indicates a usage amount of the room, and the detailed information includes room specifications and the like. In a case where the facility is composed of a plurality of buildings, the room ID identifies a building and a room in the building. The price information of the room indicates, for example, a usage amount per day and may vary at different periods. Incidentally, pricing of the room is not performed in a period in which the facility does not provide the room, and there is a case where price information in the period does not exist. The room specifications include, for example, a room type, the number of acceptable people, a room layout, a size, an Internet environment, whether a pet can be accepted, whether a child can be accepted, an introductory sentence of the room, or the like. FIG. 4A is a view illustrating an example of data storage in the transaction target database 21 in a case where the transaction target is the room of the facility. The transaction target database 21 illustrated in FIG. 4A stores facility IDs, room IDs, price information of rooms, and detailed information of the rooms.

Moreover, in a case where the transaction target is a seat on a transportation means, the supplier ID is a company ID of a company that provides the seat, the transaction target ID is a seat ID of the seat, the price information indicates a usage amount of the seat, and the detailed information includes a seat class, a seat position (e.g., rear window side), and the like. The seat ID identifies a transportation means and a seat on the transportation means. The price information of the seat indicates, for example, a usage amount in operation (traveling) time of the transportation means, and may vary at different periods. Incidentally, pricing of a seat is not performed in a period in which the company does not provide the seat (that is, transportation means is not operated) and there is a case where there is no price information in the period.

The stock database 22 is a database that stores information related to stock of transaction targets. The stock database 22 stores, for example, a supplier ID, a transaction target ID, stock information of the transaction target, and the like in association with each supplier. Here, the supplier ID and the transaction target ID are the similar to those in the transaction target database 21. In a case where the transaction target is the item, the stock information indicates the remaining number (stock quantity) of the item. The remaining number is decreased in a case where an order for the item is received. Moreover, in a case where the transaction target is a room of a facility, the stock information indicates the number of remaining rooms (stock quantity) in the same room type (or same room type and same number of acceptable people) per day. As for the number of remaining rooms, the number of remaining rooms on a reservation date is decreased in a case where a room reservation is received. Moreover, in a case where the transaction target is a seat on a transportation means, the stock information indicates the number of remaining seats (stock quantity) in each day and each time period (depending on operation time) in the same seat class. As for the number of remaining seats, the number of remaining seats on a reservation date and time period is decreased in a case where a seat reservation is received. FIG. 4B is a view illustrating an example of data storage in the stock database 22 in a case where the transaction target is the room of the facility. The stock database 22 illustrated in FIG. 4B stores facility IDs, room types, and stock information of rooms. The stock information of rooms indicates the number of remaining rooms per day.

The advertising space database 23 is a database that stores information related to advertising spaces. In the advertising space database 23, for example, an advertising space ID of the advertising space, a page ID of the page on which the advertising space is set, a page position (or range) in the page on which the advertising space is set, an advertising space type, advertising space information, and the like are stored in association with each advertising space. Here, the advertising space type indicates the guaranteed space or the non-guaranteed space. Advertising space information for the guaranteed space includes, for example, a period in which a contract can be made, a charging method (e.g., a charging method with a guaranteed publication period), a usage amount (e.g., xxx thousand yen (or yyy dollar) per month), and the like. In a case where the place tag is associated with the page, the usage amount for the guaranteed space may be set for each piece of regional information indicated by the place tag (e.g., different usage amounts are set for Tokyo and Osaka). Advertising space information for the non-guaranteed space includes, for example, a minimum winning bid price, a charging system (e.g., the selection charging method), a usage amount (e.g., xxx yen (or yyy dollar) per selection), and the like. In a case where the place tag is set on the page, the usage amount of the non-guaranteed space may be set for each piece of regional information indicated by the place tag similarly to the guaranteed space. Further, in the non-guaranteed space, a usage amount corresponding to certain regional information and a usage amount corresponding to regional information that belongs to a lower layer of the regional information are preferably set to be the same (e.g., same usage amount is set for Tokyo and Roppongi). FIG. 5A is a view illustrating an example of data storage in the advertising space database 23. The advertising space database 23 illustrated in FIG. 5A stores the advertising space ID, the page ID, the page position, the advertising space type, and the advertising space information.

The specific advertiser database 24 is a database that stores information related to the specific advertiser that has purchased the guaranteed space. In the specific advertiser database 24, for example, an advertiser ID of the specific advertiser that has purchased the guaranteed space, an advertising space ID of the purchased guaranteed space, advertising content of the specific advertiser, a contract period, and the like are stored in association with each specific advertiser. Here, the advertiser ID is the same as the supplier ID of the supplier that supplies the transaction target. The advertising content includes, for example, at least one of image data and text data. The advertising content includes information of one or a plurality of transaction targets supplied by the advertiser (regional information may be included), and a hyperlink to a page of detailed information or a page for a payment procedure of the transaction target is preferably set in the advertising content. The contract period is a period in which displaying of the advertising content of the specific advertiser is guaranteed in principle, and is determined by a site operator or is determined by specifying by the specific advertiser. Incidentally, as for the guaranteed space, for example, the site operator may present conditions such as a keyword (e.g., place or theme), a target demographic, and a price to a plurality of the suppliers, and one supplier that applies first may be able to make a purchase as the specific advertiser. FIG. 5B is a view illustrating an example of data storage in the specific advertiser database 24. The specific advertiser database 24 illustrated in FIG. 5B stores the advertiser ID of the specific advertiser, the advertising space ID, the advertising content, and the contract period.

The bid database 25 is a database that stores information related to a bid for the advertising space (the non-guaranteed space or the switchable guaranteed space). In the bid database 25, the advertiser ID of the advertiser who makes a bid, the page ID of the page on which the advertising space to be bid is set, the advertising content of the advertiser who makes the bid, the bid information, and the like are stored in association with each advertiser (bidder) who makes the bid. Here, the advertiser ID is the same as the supplier ID of the supplier that supplies the transaction target. The page on which the advertising space is set is the page specified by the bidder in bidding. The bid information includes, for example, a bid price and a bidding deadline (or bidding time).

Moreover, the bid information may include an upper limit of a budget which limit is specified by the bidder, or a remaining amount of the budget. Here, automatic purchase setting for the non-guaranteed space is possible by specifying by the bidder. In this case, in order to prevent the upper limit of the budget which limit is specified by the bidder from being reached before the bidding deadline, the remaining amount of the budget is evenly divided by the remaining time until the bidding deadline and a bid price is automatically set. As a result, in a case where the bidder does not become a winning bidder and cannot purchase a non-guaranteed space in bidding processing at a certain time point, a bid price is set a little higher in the bid processing at a next time point since the remaining amount of the budget is evenly divided by the remaining time. Incidentally, depending on the advertiser who makes the bid, there is a case where the place tag indicating regional information is specified instead of the page. In this case, for the advertiser, the page ID of the page in which the advertising space to be bid is set does not need to be stored, and the place tag specified by the advertiser is included instead in bid information of the advertiser. FIG. 5C is a view illustrating an example of data storage in the bid database 25. The bid database 25 illustrated in FIG. 5C stores the advertiser ID of the advertiser who makes the bid, the page ID, the advertising content, and the bid information.

The advertising record database 26 is a database that stores information related to advertising records of advertisers (including the specific advertiser). The advertising record database 26 stores the advertiser ID of the advertiser who has purchased the advertising space, and an advertising record in association with each advertiser. Here, the advertising record includes, for example, a selection rate (click rate (CTR) or tap rate) or a conversion rate (CVR). The selection rate is a value acquired by division of the number of times of displaying in which the advertising space is displayed by the number of times of selection in which the advertising content in the advertising space is selected. The conversion rate is a value acquired by division of the number of times of displaying in which the advertising space is displayed by the number of times of successful contract in which advertising content in the advertising space is selected and the transaction target expressed in the advertising content is purchased.

The system control unit 3 as a computer includes a CPU (Central Processing Unit), a ROM (Read Only Memory), a non-volatile memory, a RAM (Random Access Memory), and the like and executes a server program and the like on the OS. The ROM or the non-volatile memory is configured to store a program (program code). The CPU is configured to access the program code and operate as instructed by the program code. The program code includes: determination code configured to cause the CPU to determine whether the display condition is satisfied; and switching code configured to cause the CPU to switch, in a case where the display condition is not satisfied, the first advertising space to the second advertising space to display advertising content of the advertiser who wins a bid on the basis of bid information. Here, the display condition is a criterion for displaying advertising content of the specific advertiser on the first advertising space. Moreover, the program code may include a first display control code configured to cause the CPU to perform processing of displaying, on the second advertising space switched by the switching code, the advertising content of the advertiser who wins the bid on the basis of the bid information of the advertiser. Moreover, the program code may include a processing code configured to cause the CPU to perform bid processing, in a case where the display condition is not satisfied, with respect to the advertiser the bid information of which includes regional information associated with the page or regional information that belongs to a lower layer of the regional information. Further, the program code may include: setting code configured to cause the CPU to set the first advertising space to display the advertising content of the specific advertiser on the page with which regional information specified by the specific advertiser is associated; and second display code configured to cause the CPU to perform, in a case where the display condition is satisfied, processing of displaying, on the advertising space, the advertising content of the specific advertiser. This advertising content is related to the regional information.

Figure 3B:
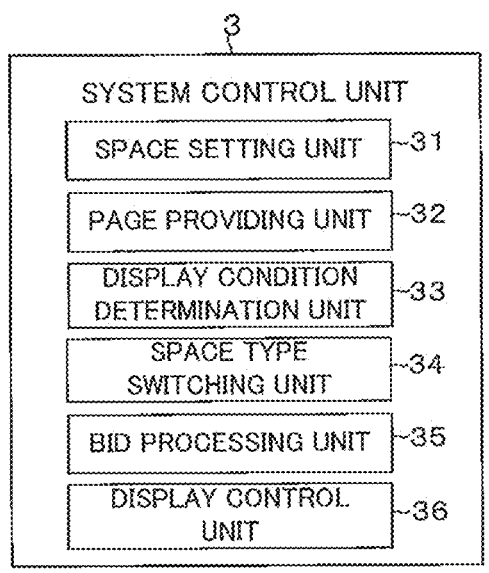
FIG. 3B is a block diagram illustrating an example of functional blocks in a system control unit 3.

FIG. 3B is a block diagram illustrating an example of functional blocks in the system control unit 3. As illustrated in FIG. 3B, by executing the server program or the like, the system control unit 3 functions as a space setting unit 31, a page providing unit 32, a display condition determination unit 33, a space type switching unit 34, a bid processing unit 35, a display control unit 36, and the like in accordance with the program code stored in, for example, the ROM or the non-volatile memory.

The space setting unit 31 sets the advertising space in a partial region in the page by defining a page position (or range) of the advertising space in structured document data that configures the page, for example. Incidentally, the space setting unit 31 may previously set the guaranteed space on the page before the purchase by the specific advertiser, or may set the guaranteed space on the page specified by the specific advertiser at the time of purchase. Moreover, in a case where the place tag is specified by the specific advertiser at the time of purchase, the space setting unit 31 may set the guaranteed space on the page associated with the specified place tag.

The page providing unit 32 transmits the page on which the advertising space is set to the user terminal CTn in response to a page request from the user terminal CTn. As a result, the page on which the advertising space is set is displayed (page view) on a display of the user terminal CTn. Here, displaying the page on which the advertising space is set is also called an impression of the advertising space. In a case where the advertising space on which the impression is performed is the guaranteed space, impression information of the guaranteed space is transmitted from the user terminal CTn to the information providing server SA. The impression information of the guaranteed space includes, for example, the page ID of the displayed page and the advertising space ID of the guaranteed space. On the other hand, in a case where the advertising space on which the impression is performed is the non-guaranteed space, impression information of the non-guaranteed space is transmitted from the user terminal CTn to the information providing server SA. The impression information of the non-guaranteed space includes, for example, the page ID of the displayed page and the advertising space ID of the non-guaranteed space.

In a case where the page request for the page on which the guaranteed space is set is received from the user terminal CTn, or in a case where the impression information of the guaranteed space is received from the user terminal CTn, the display condition determination unit 33 identifies the specific advertiser (that is, the specific advertiser who has purchased the guaranteed space) having the advertiser ID of which is associated with the advertising space ID of the guaranteed space. And then, the display condition determination unit 33 determines whether the display condition for displaying advertising content of the identified specific advertiser is satisfied. Here, there are a case where the determination whether the display condition is satisfied is made by utilization of a search condition input by the user of the user terminal CTn and a case where the determination is made without utilization of the search condition.

In a case where the search condition is not used, the display condition determination unit 33 checks stock of a transaction target supplied by the specific advertiser, and determines that the display condition is not satisfied in a case where there is no stock (stock shortage). In checking of the stock, at least one of the stock database 22 and the transaction target database 21 is referred to, and at least one of the stock information and the price information of the transaction target is acquired with the transaction target ID of the transaction target as a key. For example, in a case where the transaction target supplied by the specific advertiser is the item, it is determined that there is no stock when the remaining number indicated by the stock information of the item is zero. On the other hand, in a case where the transaction target supplied by the specific advertiser is a room or a seat, it is determined that there is no stock (shortage in remaining rooms or shortage in remaining seats) when the number of remaining rooms indicated by the stock information of the room (or the number of remaining seats indicated by the stock information of the seat) in a predetermined period (e.g., two weeks) from a time point of the stock check (e.g., detection of impression of the guaranteed space) is zero. Moreover, it is determined that there is no stock even in a case where there is no price information for the room or the seat in a predetermined period (e.g., two weeks) from the time point of the stock check (that is, pricing is not performed in the predetermined period).

On the other hand, in a case where the search condition is used, the display condition determination unit 33 checks stock of the transaction target that corresponds to the search condition input by the user of the user terminal CTn among transaction targets supplied by the specific advertiser, and determines that the display condition is not satisfied in a case where there is no stock. In other words, it is checked whether the transaction target supplied by the specific advertiser corresponds to the search condition input by the user, and it is determined that the display condition is not satisfied in a case where the transaction target does not correspond to the search condition. For example, the display condition determination unit 33 determines that the display condition is not satisfied in a case where there is not the transaction target corresponding to a usage date input by the user of the user terminal CTn. Incidentally, in a case where there is a plurality of transaction targets supplied by the specific advertiser, stock is checked for each of the transaction targets, and it is determined that a display condition is not satisfied in a case where all of the transaction targets do not correspond to the search condition. Also in the correspondence check, at least one of the stock database 22 and the transaction target database 21 is referred to, and at least one of the stock information, the price information, and the detailed information of the transaction target is acquired with the transaction target ID of the transaction target as a key.

For example, in a case where the transaction target supplied by the specific advertiser is the item, examples of search conditions include the number of items, item specs, and the like. In this case, when the remaining number (e.g., two) indicated by stock information of the item is smaller than the number (e.g., three) of items included in the search condition, it is determined that there is no stock. Moreover, when item specs (e.g., model and size) included in the search condition are not included in item specs indicated by detailed information of the item, it is determined that there is no stock (in other words, it is determined that the item does not correspond to the search condition). On the other hand, in a case where the transaction target supplied by the specific advertiser is a room or a seat, examples of search conditions include a usage date (at least one of date and time), the number of users, the number of rooms (or number of seats), and the like. In this case, when the number of remaining rooms (or the number of remaining seats) indicated by stock information on the usage date is zero, it is determined that there is no stock. Moreover, even when the number of remaining rooms (or number of remaining seats) indicated by the stock information on the usage date is one or more, the number (e.g., two people) of acceptable people indicated by the stock information on the usage date is smaller than the number (e.g., three people) of users included in the search condition, it is determined that there is no stock. Moreover, when the number of remaining rooms (or the number of remaining seats) indicated by the stock information on the usage date is smaller than the number of rooms (or the number of seats) included in the search condition, it is determined that there is no stock.

Incidentally, in a case where the transaction target supplied by the specific advertiser is a room, there is a case where the search condition includes a condition related to room specifications (e.g., having a pet or having a child). In this case, even when the number of remaining rooms indicated by stock information on the usage date is one or more, it is determined that there is no stock unless the condition related to the room specifications included in the search condition satisfies room specifications indicated by detailed information of the room. Moreover, even in a case where a room or seat supplied by the specific advertiser does not correspond to the search condition, for example, in a case where there is price information for the room or the seat in a predetermined period from a time point of the correspondence check (that is, pricing is performed in the predetermined period), it may be determined that the display condition is satisfied.

In a case where the display condition determination unit 33 determines that the display condition for displaying advertising content of the specific advertiser is not satisfied, the space type switching unit 34 switches the guaranteed space of the specific advertiser to the non-guaranteed space. For example, the space type switching unit 34 switches the guaranteed space to the non-guaranteed space by rewriting a space flag stored in a predetermined region of the RAM from 1 (the guaranteed space) to 0 (the non-guaranteed space). This space flag is referred to by the bid processing unit 35 and the display control unit 36, and processing is performed according to the space flag. Incidentally, after switching from the guaranteed space to the non-guaranteed space, the space flag returns to an original state (that is, rewriting from 0 (the non-guaranteed space) to 1 (the guaranteed space) is performed), for example, after an end of the session.

For example, in a case where impression information of the non-guaranteed space is received from the user terminal CTn, or in a case where switching from the guaranteed space to the non-guaranteed space is performed by the space type switching unit 34, the bid processing unit 35 identifies, from the bid database 25, at least one of advertiser IDs associated with the page ID of the page on which the non-guaranteed space is set and advertiser IDs associated with bid information including a place tag of the page on which the non-guaranteed space is set. That is, advertiser IDs of bidders are identified. Here, the bid processing unit 35 may identify an advertiser ID associated with bid information including regional information (e.g., Roppongi) that belongs to a lower layer of regional information (e.g., Tokyo) indicated by a place tag of the page on which the non-guaranteed space is set. As a result, a range of bidders can be expanded, and it is possible to improve an advertising effect of different advertising content displayed on the advertising space instead of the advertising content of the specific advertiser.

Incidentally, bidders on which identification of advertiser IDs is performed are preferably limited to advertisers having stock of transaction targets. In this case, as in a case of the guaranteed space, the bid processing unit 35 checks stock of transaction targets supplied by advertisers that make bids (or checks stock of transaction targets that correspond to the search condition input by the user), and does not identify an advertiser ID of the advertiser having no stock (that is, authority as a bidder is not given).

Then, the bid processing unit 35 acquires pieces of bid information associated with the specified advertiser IDs from the bid database 25, and executes bid processing on the basis of the acquired pieces of bid information. That is, the bid processing is performed with advertisers identified by the identified advertiser IDs being targets. In the bid processing, the bid processing unit 35 calculates scores on the basis of bid prices included in the acquired pieces of bid information, and determines, as a winning bidder, an advertiser having the highest score among the calculated scores. Each of such scores may be calculated only from a bid price (for example, score=k (coefficient)×bid price) or may be calculated on the basis of a bid price and a selection rate (for example, score=bid price×selection rate). Alternatively, the score may be calculated on the basis of a bid price and a conversion rate (for example, score=bid price×conversion rate). Here, the selection rate and the conversion rate are advertising records that advertising content of an advertiser is selected by the user, and can be acquired from the advertising record database 26 with an advertiser ID of the advertiser as a key. Incidentally, in a case where bidding is performed with different currencies, the bid processing is executed at an exchange rate updated regularly (every hour, for example).

In a case where the display condition determination unit 33 determines that the display condition for displaying advertising content of the specific advertiser is satisfied, the display control unit 36 performs processing of acquiring advertising content of the specific advertiser from the specific advertiser database 24 and displaying the acquired advertising content on the guaranteed space. Namely, the display control unit 36 displays the advertising content of the specific advertiser on the guaranteed space by transmitting the advertising content to the user terminal CTn via the communication unit 1. Incidentally, the display control unit 36 may acquire advertising content related to regional information indicated by the place tag of the page on which the guaranteed space is set and perform displaying thereof on the guaranteed space. Thus, an advertising effect of the advertising content of the specific advertiser can be improved.

Moreover, in a case where the bid processing unit 35 determines the advertiser as the winning bidder of the non-guaranteed space, the display control unit 36 performs processing of acquiring advertising content of the determined advertiser from the bid database 25 and displaying the acquired advertising content in the non-guaranteed space (including the non-guaranteed space switched from the guaranteed space). Namely, the display control unit 36 displays the advertising content of the determined advertiser in the non-guaranteed space by transmitting the advertising content to the user terminal CTn via the communication unit 1. As a result, instead of displaying the advertising content of the specific advertiser in the guaranteed space, different advertising content that can be expected to have a higher advertising value can be displayed, by bidding, in the non-guaranteed space switched from the guaranteed space. Thus, such an advertising space (that is, the guaranteed space and the non-guaranteed space) can be effectively used. Here, in a case where there is a plurality of transaction targets (e.g., facilities) supplied by the determined advertiser, it is preferable that advertising content indicating a facility with a low price among the plurality of transaction targets is preferably displayed.

[2. Operation of Information Providing System S]

Next, a first embodiment and a second embodiment of an operation of the information providing system S will be described separately.

First Embodiment

First, an operation of the information providing system S in the first embodiment will be described with reference to FIG. 6. The first embodiment is an example of a case where the theme-featured page as illustrated in FIG. 2A is displayed on the user terminal CT1. FIG. 6 is a flowchart illustrating an example of processing of the system control unit 3 in the first embodiment.

As a premise of the operation in the first embodiment, for example, the theme-featured page on which the guaranteed space is set is transmitted from the travel site to the user terminal CT1 and displayed on the display thereof in response to a page request from the user terminal CT1, whereby impression information of the guaranteed space is transmitted from the user terminal CT1 to the information providing server SA. The processing illustrated in FIG. 6 is started when the impression information of the guaranteed space is received from the user terminal CT1. Incidentally, the processing illustrated in FIG. 6 may be started when the page request for the theme-featured page is received from the user terminal CT1 (that is, started before the impression information of the guaranteed space is received).

When the processing illustrated in FIG. 6 is started, the system control unit 3 identifies, from the specific advertiser database 24, an advertiser ID associated with the advertising space ID included in the received impression information (e.g., advertising space ID of the guaranteed space F1 set on the theme-featured page) (Step S1). That is, the advertiser ID of the specific advertiser is identified.

Then, the system control unit 3 determines whether the display condition for displaying advertising content of the specific advertiser (e.g., accommodation facility) identified by the advertiser ID identified in Step S1 is satisfied (Step S2).

For example, the display condition determination unit 33 determines that the display condition is satisfied by acquiring stock information (e.g., stock information of a room) associated with the advertiser ID (supplier ID) of the specific advertiser from the stock database 22 and confirming that there is stock of the transaction target, for example, on the basis of the stock information in a predetermined period (e.g., two weeks) from the present time (Step S2: YES) and proceeds to Step S3. On the other hand, the display condition determination unit 33 determines that the display condition is not satisfied by confirming that there is no stock on the basis of the stock information (Step S2: NO), and proceeds to Step S5.

In Step S3, the system control unit 3 acquires, from the specific advertiser database 24, advertising content of the specific advertiser identified by the advertiser ID identified in Step S1. Here, the system control unit 3 preferably acquires the advertising content related to regional information indicated by the place tag associated with the theme-featured page.

Then, the system control unit 3 (the display control unit 36) transmits the advertising content acquired in Step S3 to the user terminal CT1 (Step S4). The advertising content transmitted in such a manner is received by the user terminal CT1 and displayed in the guaranteed space F1 set on the theme-featured page.

In Step S5, the system control unit 3 (the space type switching unit 34) switches the guaranteed space F1 of the specific advertiser to the non-guaranteed space F1. Then, the system control unit 3 (the bid processing unit 35) identifies, from the bid database 25, advertiser IDs (supplier IDs) associated with pieces of bid information including the place tag associated with the theme-featured page on which the non-guaranteed space F1 switched in Step S5 is set (Step S6). That is, advertiser IDs of bidders are identified. Incidentally, in the Step S6, the system control unit 3 may identify advertiser IDs associated with, in addition to pieces of the bid information, bid information including regional information that belongs to a lower layer of regional information indicated by the place tag.

Here, with the advertiser IDs associated with the pieces of bid information as keys, the system control unit 3 (the bid processing unit 35) acquires, for example, pieces of stock information (e.g., stock information of a room) in a predetermined period (e.g., two weeks) from the present time from the stock database 22, checks stock of transaction targets on the basis of the acquired pieces of stock information, and preferably identifies only an advertiser ID of an advertiser having stock. Incidentally, the system control unit 3 may make an inquiry to a database of an advertiser having no stock and determine whether a bid can be made according to an acquired response.

Then, the system control unit 3 (the bid processing unit 35) acquires pieces of bid information associated with the advertiser IDs identified in Step S6 from the bid database 25, executes bid processing on the basis of the acquired pieces of bid information as described above (Step S7), and determines a winning bidder (Step S8).

Then, the system control unit 3 acquires advertising content of the winning bidder determined in Step S8 from the bid database 25 (Step S9). Here, the system control unit 3 preferably acquires advertising content related to regional information indicated by the place tag associated with the theme-featured page.

Then, the system control unit 3 (the display control unit 36) transmits the advertising content acquired in Step S9 to the user terminal CT1 (Step S10). The advertising content transmitted in such a manner is received by the user terminal CT1 and displayed in the non-guaranteed space F1 set on the theme-featured page.

According to the first embodiment, it is possible to previously prevent a wasted operation in which a user that browses advertising content displayed in the guaranteed space F1 selects the transaction target introduced by the advertising content but a state returns to that before the selection due to a lack of stock, and it is possible to more effectively use the advertising space.

Second Embodiment

Next, an operation of the information providing system S in the second embodiment will be described with reference to FIG. 7 and FIG. 8. The second embodiment is an example in which the search result page as illustrated in FIG. 2B is displayed on the user terminal CT1. FIG. 7 is a flowchart illustrating an example of processing of the system control unit 3 in the second embodiment. FIG. 8 is a view illustrating an example of a search condition input page for the transaction target.

The search condition input page illustrated in FIG. 8 is transmitted, for example, to the user terminal CT1 from the travel site and displayed on the display thereof in response to a page request from the user terminal CT1, for example. When the user of the user terminal CT1 inputs search conditions (e.g., accommodation destination, usage date (schedule), and the number of users) for the transaction target (accommodation facility in the example of FIG. 8) to a search condition input unit IN and selects a search button B on the search condition input page displayed in such a manner, a search query including the input search conditions is transmitted from the user terminal CT1 to the information providing server SA. The search conditions input to the search condition input unit IN may be keywords directly input by the user, or may be keywords selected by the user from a prepared candidate list.

When receiving the search query from the user terminal CT1, the information providing server SA searches for the transaction target on the basis of the search conditions included in the search query, and transmits a search result page which includes a list of search results of hit transaction targets and on which the guaranteed space F2 is set to the user terminal CT1. In such a manner, the search result page is received by the user terminal CT1 and displayed on the display thereof, whereby impression information of the guaranteed space is transmitted from the user terminal CT1 to the information providing server SA. The processing illustrated in FIG. 7 is started when the impression information of the guaranteed space is received from the user terminal CT1. Incidentally, the processing illustrated in FIG. 7 may be started when the search query is received from the user terminal CT1 (that is, started before the impression information of the guaranteed space is received).

When the processing illustrated in FIG. 7 is started, the system control unit 3 identifies, from a specific advertiser database 24, an advertiser ID associated with the advertising space ID included in the received impression information (e.g., advertising space ID of the guaranteed space F2 set on the search result page) (Step S11).

Then, the search conditions input by the user of the user terminal CT1 are acquired from the received search query (Step S12). Then, the system control unit 3 determines whether the display condition for displaying advertising content of the specific advertiser identified by the advertiser ID identified in Step S11 is satisfied on the basis of the search conditions acquired in Step S12 (Step S13).

For example, the display condition determination unit 33 determines that the display condition is satisfied by acquiring stock information (e.g., stock information of a room) associated with the advertiser ID (supplier ID) of the specific advertiser from the stock database 22, and checking that there is stock of the transaction target that corresponds to the search conditions on the basis of the stock information (Step S13: YES), and proceeds to Step S14. On the other hand, the display condition determination unit 33 determines that the display conditions are not satisfied by checking that there is no stock of the transaction target that corresponds to the search conditions on the basis of the stock information (Step S13: NO), and proceeds to Step S16.

Incidentally, the processing of Step S14 and Step S15 are similar to the processing of Step S3 and Step S4 illustrated in FIG. 6. Moreover, the processing of Step S16 to Step S21 are similar to the processing of Step S5 to Step S10 illustrated in FIG. 6. Moreover, in the operation of the second embodiment, processing for a non-guaranteed space F3 set on the search result page illustrated in FIG. 2B is executed similarly to the processing of Step S17 to Step S21.

By the way, in the stock check in Step S13 in the second embodiment, the search conditions input to the search condition input unit IN immediately before the selection of the search button B are used. However, this is not a limitation. For example, the search condition at any time point which condition is input during session between the user terminal CT1 and a site providing the search condition input page or during login may be used. Moreover, the system control unit 3 may check stock by acquiring a cookie stored in a browser of the user terminal CT1 and using the search condition included in the cookie. Alternatively, there is a case where a search condition input in a search site different from the travel site that provides the search condition input page is automatically input into the travel site (for example, date is included in a URL) when a movement from the search site to the travel site is made. In this case, stock may be checked by utilization of the search condition passed from the search site to the travel site.

According to the second embodiment, it is possible to previously prevent a wasted operation in which a user that browses advertising content displayed on the guaranteed space F2 selects the transaction target introduced by the advertising content but a state returns to that before the selection since a condition desired by the user is not satisfied, and it is possible to use such the advertising space more effectively.

As described above, according to the embodiment, it is determined whether the display condition for displaying advertising content of the specific advertiser in the guaranteed space to display the advertising content is satisfied, and the guaranteed space is switched to the non-guaranteed space to display advertising content of the advertiser that wins a bid on the basis of bid information in a case where it is determined that the display condition is not satisfied, whereby it is possible to make the advertiser use the advertising space effectively while reducing a wasted operation by the user that browses the advertising content.

Modification Example

In the embodiment, a plurality of specific advertisers may be able to purchase one guaranteed space. In this case, in the specific advertiser database 24, an advertiser ID of each of the plurality of specific advertisers or the like is stored in association with an advertising space ID of one guaranteed space. The display condition determination unit 33 determines whether the display conditions are satisfied, for example, by checking stock of the transaction target with respect to each of the plurality of specific advertisers. Then, the space type switching unit 34 switches the guaranteed space to the non-guaranteed space in a case where the display condition determination unit 33 determines that the display conditions are not satisfied with respect to each of the specific advertisers. For example, when there is no remaining room of a first specific advertiser (facility), a remaining room status of a room of a second specific advertiser (facility) is checked. Then, when there is also no remaining room in the second specific advertiser, the input processing is performed on the basis of the bid information. Accordingly, the guaranteed space can be shared among the plurality of specific advertisers before the guaranteed space is switched by the space type switching unit 34, and the guaranteed space can be used more effectively. Here, display priority for displaying advertising content in the guaranteed space may be set between the first specific advertiser and the second specific advertiser. The display priority is preferably determined on the basis of at least one of a contract fee, a past conversion rate, a transaction volume on the travel site, and the like. For example, advertising content of the first specific advertiser and advertising content of the second specific advertiser are displayed in order according to the display priority.

Although one embodiment of the present invention has been described above, the present invention is not limited to above embodiments, and various configurations and the like may be modified from those in the embodiment within the spirit and scope of the present invention, and that case is also included in the technical scope of the present invention. In the embodiments, the page is described as an example of the medium on which the advertising space is set. However, the medium on which the advertising space is set may be, for example, a window or the like displayed by an application installed in a terminal. In the embodiments, it is determined that the display condition is not satisfied in a case where there is no stock of the transaction target or in a case where there is no correspondence to the search condition. However, in addition, it may be determined that the display condition is not satisfied according to setting information set by the specific advertiser, for example. Moreover, information displayed in the advertising space by advertising content may not need to be information of the transaction target supplied by the advertiser.

What is claimed is:

1. An information processing device comprising:
    at least one memory configured to store program code; and
    at least one processor configured to access the program code and operate as instructed by the program code, the program code including:
    determination code configured to cause at least one processor to determine whether a display condition is satisfied, the display condition being a condition for displaying a first advertising content of a specific advertiser on an advertising space which is set on a medium that can be displayed on a terminal;
    switching code configured to cause at least one processor to, based on the display condition not being satisfied, switch the first advertising content of the specific advertiser to a second advertising content of a bidder who wins a bid on the basis of bid information,
    wherein the first advertising content includes information of a transaction target provided by the specific advertiser and the second advertising content includes information of a transaction target provided by the bidder,
    wherein the determination code is further configured to cause at least one processor to:
        acquire first stock information indicating stock quantity associated with an ID of the specific advertiser from a stock database, to check whether there is stock of the transaction target on the basis of the acquired first stock information; and
        determine that the display condition is not satisfied when there is no stock of the transaction target provided by the specific advertiser as a result of the checking, and
    wherein the program code further comprises:
        first acquiring code configured to cause at least one processor to acquire pieces of second stock information indicating stock quantity associated with an ID of each of a plurality of bidders from the stock database when there is no stock of the transaction target provided by the specific advertiser as a result of the checking;
        identifying code configured to cause at least one processor to identify the ID of each of the plurality of bidders having the stock on the basis of the acquired pieces of the second stock information;
        second acquiring code configured to cause at least one processor to acquire pieces of the bid information associated with each of the identified IDs from a bid database;
        executing code configured to cause at least one processor to execute bid processing on the basis of the acquired pieces of the bid information to determine a winning bidder among the plurality of bidders corresponding to each of the identified IDs; and
        display control code configured to cause at least one processor to display the second advertising content of the determined winning bidder on the advertising space.

2. The information processing device according to claim 1, wherein
    the transaction target corresponds to a search condition input by a user of the terminal.

3. The information processing device according to claim 1, wherein
    the determination code is further configured to cause at least one processor to determine that the display condition is not satisfied in a case where there is not the transaction target corresponding to a usage date input by a user of the terminal.

4. The information processing device according to claim 1, the program code further including: processing code configured to cause at least one processor to perform bid processing, in a case where the display condition is not satisfied, with respect to the bid information including regional information associated with the medium or regional information that belongs to a lower layer of the regional information.

5. The information processing device according to claim 1, the program code further including:
    setting code configured to cause at least one processor to set the advertising space to display the first advertising content of the specific advertiser on the medium with which regional information specified by the specific advertiser is associated,
    wherein the display control code is further configured to cause at least one processor to, based on the display condition being satisfied, display, on the advertising space, the first advertising content of the specific advertiser, the first advertising content being related to the regional information.

6. The information processing device according to claim 1, wherein
    the advertising space is a space on the medium to display at least one advertising content of at least one specific advertiser,
    the determination code causes at least one processor to determine, for each of the at least one specific advertiser, whether the display condition is satisfied, and
    the switching code causes at least one processor to, based on the display condition not being satisfied with respect to each of the at least one specific advertiser, switch the first advertising content to the second advertising content to display the second advertising content of the advertiser who wins the bid on the basis of the bid information.

7. An information processing method performed by at least one computer, the method comprising:
    determining whether a display condition is satisfied, the display condition being a condition for displaying a first advertising content of a specific advertiser an advertising space which is set on a medium that can be displayed on a terminal; and
    based on the display condition not being satisfied, switching the first advertising content of the specific advertiser to a second advertising content of a bidder who wins a bid on the basis of bid information,
    wherein the first advertising content includes information of a transaction target provided by the specific advertiser and the second advertising content includes information of a transaction target provided by the bidder,
    wherein the determining whether the display condition is satisfied further comprises:
        acquiring first stock information indicating stock quantity associated with an ID of the specific advertiser from a stock database, to check whether there is stock of the transaction target on the basis of the acquired first stock information; and
        determining that the display condition is not satisfied when there is no stock of the transaction target provided by the specific advertiser as a result of the checking, and wherein the method further comprises:
acquiring pieces of second stock information indicating stock quantity associated with an ID of each of a plurality of bidders from the stock database when there is no stock of the transaction target provided by the specific advertiser as a result of the checking;
identifying the ID of each of the plurality of bidders having the stock on the basis of the acquired pieces of the second stock information;
acquiring pieces of the bid information associated with each of the identified IDs from a bid database;
executing bid processing on the basis of the acquired pieces of the bid information to determine a winning bidder among the plurality of bidders corresponding to each of the identified IDs; and
displaying the second advertising content of the determined winning bidder on the advertising space.

8. A non-transitory computer readable storage medium having stored thereon a program configured to cause at least one processor to:
determine whether a display condition is satisfied, the display condition being a condition for displaying a first advertising content of a specific advertiser on an advertising space which is set on a medium that can be displayed on a terminal; and
based on the display condition not being satisfied, switch the first advertising content of the specific advertiser to a second advertising content an advertiser who wins a bid on the basis of bid information,
wherein the first advertising content includes information of a transaction target provided by the specific advertiser and the second advertising content includes information of a transaction target provided by the bidder,
wherein the at least one processor is further configured to:
acquire first stock information indicating stock quantity associated with an ID of the specific advertiser from a stock database, to check whether there is stock of the transaction target on the basis of the acquired first stock information;
determine that the display condition is not satisfied when there is no stock of the transaction target provided by the specific advertiser as a result of the checking;
acquire pieces of second stock information indicating stock quantity associated with an ID of each of a plurality of bidders from the stock database when there is no stock of the transaction target provided by the specific advertiser as a result of the checking;
identify the ID of each of the plurality of bidders having the stock on the basis of the acquired pieces of the second stock information;
acquire pieces of the bid information associated with each of the identified IDs from a bid database;
execute bid processing on the basis of the acquired pieces of the bid information to determine a winning bidder among the plurality of bidders corresponding to each of the identified IDs; and
display the second advertising content of the determined winning bidder on the advertising space.

* * * * *